ACOUSTIC VIBRATION GENERATOR AND COUPLER

Filed Feb. 9, 1961 7 Sheets-Sheet 1

INVENTOR.
JOHN V. BOUYOUCOS
BY Daniel D. Sharp
ATTORNEY

Oct. 19, 1965 J. V. BOUYOUCOS 3,212,472

ACOUSTIC VIBRATION GENERATOR AND COUPLER

Filed Feb. 9, 1961 7 Sheets-Sheet 2

Oct. 19, 1965 J. V. BOUYOUCOS 3,212,472

ACOUSTIC VIBRATION GENERATOR AND COUPLER

Filed Feb. 9, 1961 7 Sheets-Sheet 3

Oct. 19, 1965 J. V. BOUYOUCOS 3,212,472

ACOUSTIC VIBRATION GENERATOR AND COUPLER

Filed Feb. 9, 1961 7 Sheets-Sheet 4

ACOUSTIC VIBRATION GENERATOR AND COUPLER

Filed Feb. 9, 1961 7 Sheets-Sheet 5

Oct. 19, 1965 J. V. BOUYOUCOS 3,212,472

ACOUSTIC VIBRATION GENERATOR AND COUPLER

Filed Feb. 9, 1961 7 Sheets-Sheet 6

Oct. 19, 1965 J. V. BOUYOUCOS 3,212,472

ACOUSTIC VIBRATION GENERATOR AND COUPLER

Filed Feb. 9, 1961 7 Sheets-Sheet 7

United States Patent Office 3,212,472

Patented Oct. 19, 1965

3,212,472
ACOUSTIC VIBRATION GENERATOR AND COUPLER

John V. Bouyoucos, 10 Blossom Circle E., Rochester 10, N.Y.

Filed Feb. 9, 1961, Ser. No. 88,164
30 Claims. (Cl. 116—137)

The present invention relates to fluid operated acoustic vibration generators and more particularly to acoustic vibration generator couplers employed therewith.

In United States Letters Patent No. 2,792,804 for "Acoustic-Vibration Generator and Method," issued May 21, 1957, to John V. Bouyoucos and Frederick V. Hunt, there is described an acoustic vibration generator or oscillator that operates by virtue of acoustic feedback applied to a fluid pressure-actuated valving mechanism. Such a valving mechanism may be made to act periodically to modulate an otherwise uniform flow of a fluid medium and, in so doing, to originate pressure variations in oscillator cavities arising from the alternate fluid accelerations and decelerations accompanying the modulatory process. These pressure variations may then be transmitted by an acoustic feedback path to one or more regions where they can react in such phase and magnitude as to control and sustain the valving action, thereby producing a pulsating flow of the fluid medium for generating acoustic vibrations.

The aforesaid patent, together with United States Letters Patent No. 2,859,726 for "Acoustic-Vibration Coupler," issued November 11, 1958, to John V. Bouyoucos and Fredrick V. Hunt, which is a division of the aforesaid United States Letters Patent No. 2,792,804, describes various acoustic vibration couplers which permit the interchange of acoustic energy between fluid-filled acoustic vibration generators or oscillators and a receiving medium. Among the means mentioned for coupling acoustic pulsations developed by an acoustic vibration generator to a load is a resilient acoustic window which acts to block the internal elevated average operating pressure, yet which is essentially transparent to the generated acoustic signal. In another form of coupling means disclosed in the above patents, the housing for the generator may itself be an elastic shell in direct contact with the contained vibrating fluid. Still another form of coupling means disclosed is a tubular structure having flexible walls which can be inserted in a fluid medium into which it is desired to transfer acoustic vibrations. The dilations and contractions of the tube walls, owing to the pressure waves propagating axially within the internally contained fluid, give rise to compressional waves travelling in the medium surrounding the coupling structure.

In a copending application of John V. Bouyoucos and Frederick V. Hunt, Serial No. 747,159, filed July 8, 1958, for "Acoustic-Vibration Generator and Valve, now Patent No. 3,004,512, issued October 17, 1961 there is described an improved free-floating valve mechanism which is supported and guided during oscillation by means of a thin lubricating fluid film, rather than being supported mechanically by elastic members, as in the previously mentioned patents. In this way, the problem of fatigue in the valve support mechanism is greatly reduced. The aforesaid application also discloses a device wherein the pressure variations in one of two acoustic chambers is transmitted by a horn to the interior surface of a hemispherical compliant diaphragm or window. A portion of the incident energy is conveyed through the window to an external medium and the remaining energy is reflected back into the oscillator to help sustain oscillations. The aforesaid application further discloses a load attached directly to the movable valve body.

The coupling techniques just discussed have been found to work satisfactorily for the purposes for which they were intended. However, such coupling techniques are not particularly suitable for transmitting high level energy at high energy density to such loads as processing attachments or drilling bits, or for use at low sonic frequencies where displacement of coupling surfaces would quickly generate fatigue of those coupling members subject to mechanical bending, flexure and/or extension. Furthermore, coupling techniques that involve attachments directly to a free-floating valve may stall the generator even with a nondissipative load, if such load is highly massive or stiff.

The techniques embodied in this invention provide for a transfer of acoustic energy (by coupling means) from an acoustic vibration generator to an external receiving medium in a manner to prevent stalling or stopping of the acoustic generator when subject to high or variable impedance loads. This is achieved by isolating the coupling means from the valving operation so that one can operate at different displacement levels for the valve and the coupling means, thereby permitting proper matching to be readily obtained between the oscillator orifices and the load.

An object of this invention to provide an acoustic vibration generator and oscillator of the type described in the heretofore mentioned patents and copending application with a novel and improved coupling means—herein defined as that portion of the acoustic vibration generator which accepts energy from the oscillator cavities and transfers it to an external load—which is particularly applicable to the coupling of energy at high density and vibration amplitudes directly to an external load without necessarily requiring the bending or extension of mechanical coupling members forming a part of the coupling means.

In accordance with this invention, the coupling means for coupling acoustic energy from the oscillator cavities may consist of a free piston coupler which can be balanced statically while being driven acoustically by the fluid pressure variations generated within the oscillator cavities. In other words, the piston coupler can be free to move dynamically as a rigid body to couple out the acoustic forces generated by the push-pull cavity pressure variations without having to be subjected to a net static force, arising from the elevated average pressures within the oscillator cavities, and without having to resort to elastic bending or extension. Consequently, the piston-coupler can transfer acoustic energy at high energy density from the oscillator cavities to a load or load-coupling mechanism without being subject to fatigue under repeated strain. In some cases, the piston coupler may cooperate with a mechanical or a fluid means, not a part of the coupling means, per se, which introduces a compliance for impedance matching between the generator and the load. In some cases, too, the coupling means may develop a unidirectional biasing force, as, for example, against a load, in response to the elevated average pressures in the oscillator cavities, rather than be exactly balanced statically. The piston-coupler oscillator can operate as a push-pull oscillator with double-ended couplings, that is to say, output coupling can be achieved directly from both cavities. It is also possible to operate the piston-coupler oscillator as a single-ended device wherein the acoustic force on the piston derives from pressure variations in one only of the oscillator cavities.

Another object of this invention is to provide an acoustic vibration generator which can be simply designed either to radiate acoustic energy uniformly at relatively low energy density from the entire surface of a large energy radiating element, or to couple acoustic energy at exceptionally high energy density to a load.

Another object of the invention is to provide an acoustic vibration generator having a massive coupling member to which is attached an elastic (compliant) structure to permit an optimum impedance match as well as maximum power transfer to be obtained between the generator and the load impedance.

Another object of the invention is to provide an acoustic vibration generator in which acoustic forces operable on the coupling means and valving mechanisnm are so balanced that vibratory energy is not transferred to the generator housing.

Another object of the invention is to provide an acoustic vibration generator in which the motion of the valve mechanism and housing are in phase opposition to accentuate or amplify the orifice area variation.

Another object of the invention is to provide novel means for combining in a single device two or more acoustic vibration generators or oscillators having a common energy coupling member wherein all generators are maintained in phase synchronism.

Another object of the invention is to provide an array of individual acoustic vibration generating devices each of which is capable of transferring energy in phase synchronism with one another.

A still further object of the invention is to provide an acoustic vibration generator and coupler which is relatively simple to construct, inexpensive to manufacture, and economical of moving parts.

Other objects and advantages reside in certain novel features of arrangement and construction of parts which will become apparent from the following detailed description taken in connection with the accompanying drawings wherein.

Figure 1:
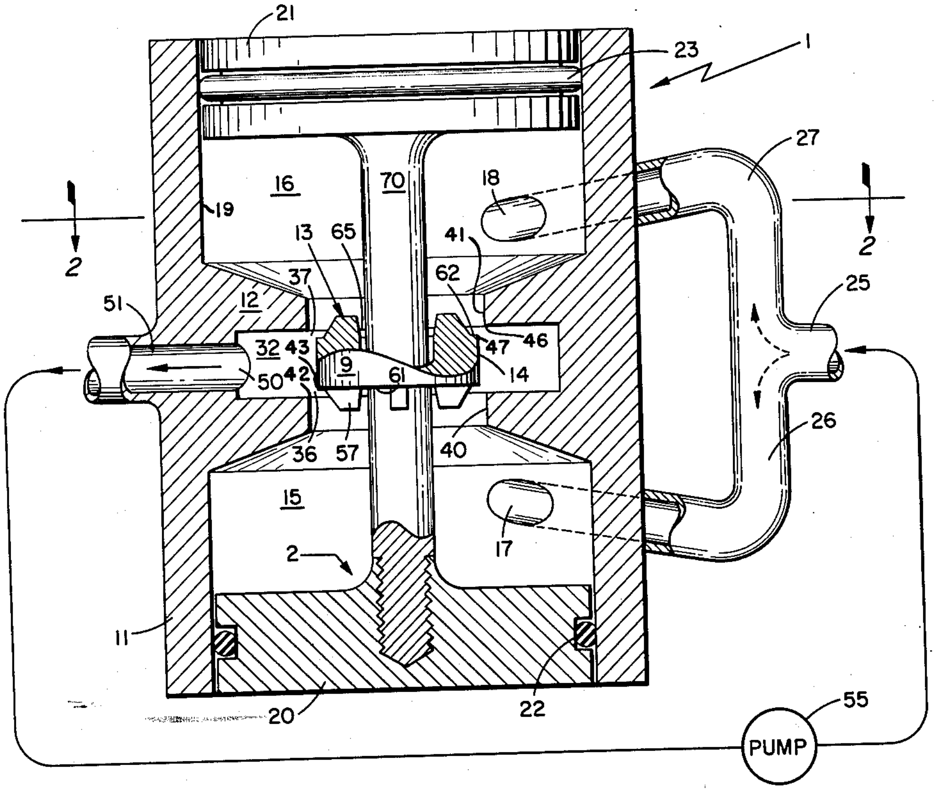
FIG. 1 is a central longitudinal section view, partly in elevation, of an acoustic vibration generator having a free-floating valve disposed in an equilibrium position within a portion of a housing of restricted inner diameter.
Figure 2:
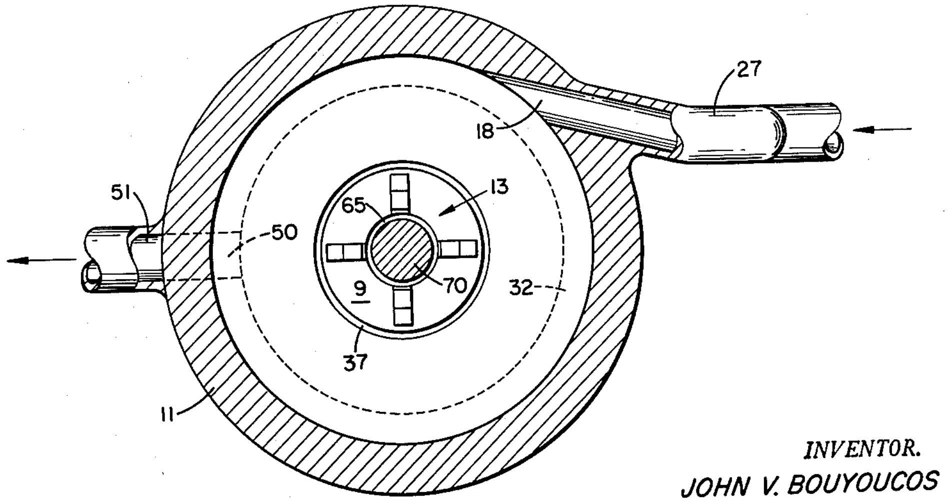
FIG. 2 is a transverse section view of the device of FIG. 1 taken along line 2—2.
Figures 3, 4, 5:
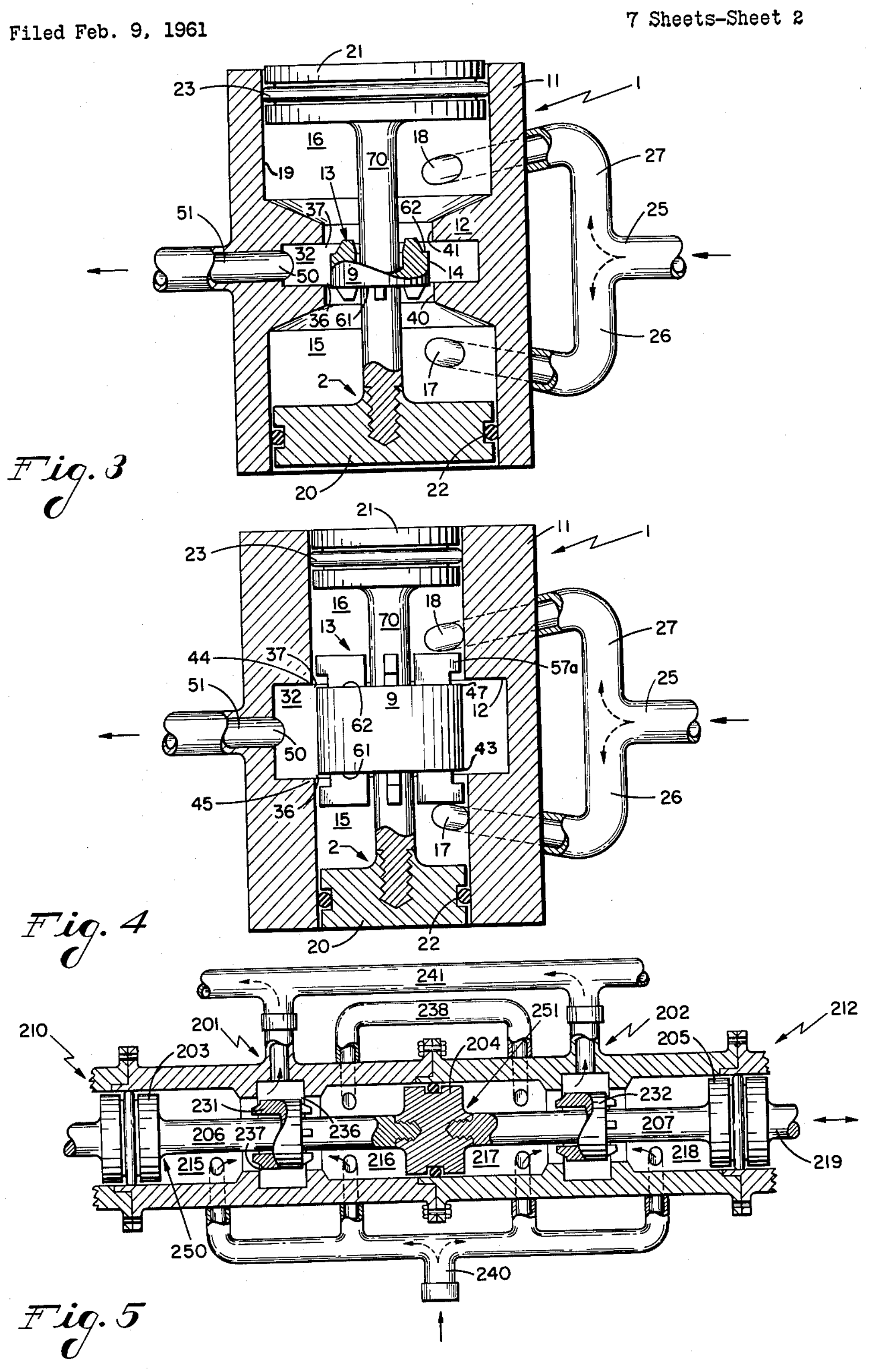
FIG. 3 is a central longitudinal section view showing the device of FIG. 1 with the valve displaced from the equilibrium position in one of two possible directions.
FIG. 4 is a central longitudinal section view of a device which differs from that of FIG. 1 in that the restricted inner diameter of the housing and the valve are enlarged so that to the outer diameter of the valve is substantially equal to the maximum inner diameter of the generator housing.
FIG. 5 is a section view illustrating a cascade connection of a plurality of acoustic vibration generators, of the type exemplified in FIGS. 1–3, for supplying energy to a single load or energy receiver.

Reference is first directed to FIGS. 1 to 3 which illustrate an acoustic vibration generator 1 equipped with a coupling means 2 embodying some of the more essential features of the invention. The acoustic vibration generator 1 is of the push-pull type with a deflection path acoustic circuit, and is one of several types of applicable generators which are ideally suited for the coupling means to be described.

The acoustic vibration generator 1 of FIGS. 1 to 3 comprises a housing 11 having an axial bore 19, a stationary port structure 12 disposed centrally within this housing bore 19, a free-floating reciprocating valve 13 positioned within the stationary port structure 12, and a pair of freely movable piston-coupler members 20 and 21 which terminate opposite ends of the housing 11, and which are interconnected rigidly by shaft 70. The stationary port structure 12, free-floating reciprocating valve 13, and free piston assembly 20, 70, 21 divide the housing bore 19 axially into two acoustic chambers or cavities 15 and 16. In operation, these acoustic chambers 15 and 16 are to be fluid filled with a fluid medium under pressure. For that purpose, inlet ports 17 and 18 are located on the outer sides of the stationary port structure 12 for introducing fluid under pressure into the respective cavities 15 and 16. The coupling pistons 20 and 21 are provided with O-rings 22 and 23 which will permit free piston motion and yet which provide a hydraulic seal for the fluid within the cavities 15 and 16.

The stationary port structure 12 cooperates with valve 13 to form variable annular discharge orifices 36 and 37. The orifice 36 is formed by the upper edge 42 of land 40 of the stationary port structure, and by the lower edge 43 of rim 14 of the valve 13. Likewise, the orifice 37 is formed by the lower edge 46 of land 41 of the stationary port structure and by the upper edge 47 of rim 14 of valve 13. The free-floating valve 13 is free to move axially within the land region of the stationary port structure in response to fluid pressure variations developed within acoustic cavities 15 and 16, thereby to control the flow of the fluid medium from the respective cavities 15 and 16 into the discharge or exhaust cavity 32. The fluid medium in passing through the variable annular orifices 36 and 37 enters the discharge cavity 32 at a reduced pressure. The fluid medium leaves the discharge cavity 32 by way of exhaust port 50 and exhaust channel 51.

The complete hydraulic path of the fluid medium in the acoustic vibration generator 1, shown in FIGS. 1–3, may be traced by starting at inlet channel 25, in which a pressurized fluid medium, such as a low viscosity hydraulic oil or other suitable fluid medium, is introduced. the inlet channel 25 diverges into lower and upper channels 26 and 27, respectively, terminating at inlet ports 17 and 18. The length of the upper channel 27, as well as that of the lower channel 26, may be chosen to be a quarter-wavelength of the operating frequency of the generator 1 in order to provide a filtering action to isolate the acoustic circuit of the generator 1 from the flow source 55. The flow source 55 may be a conventional hydraulic pump. From the inlet ports 17 and 18, the fluid medium issues into respective acoustic cavities 15 and 16. Upon filling these cavities, the fluid medium then passes through variable area orifices 36 and 37 into the discharge cavity 32, through the exhaust port 50 into the exhaust channel 51 and thence to the low pressure side of flow source 55.

The free-floating valve 13, as well as the acoustic cavities 15 and 16, the coupler pistons 20 and 21, and stationary port structure 12, are normally cylindrical in cross-section, as shown in FIG. 2. The free-floating valve 13, as such, forms no part of this invention since it is disclosed in the copending application heretofore mentioned. The valve 13 comprises a cylindrical body 9, and may have radial fins 57 projecting on the end faces 61 and 62. The fins 57 are recessed from the outer diameter of the valve body 9 so as not to restrict the annular orifices 36 and 37. These fins may be used to give the valve 13 a spinning and centering action when driven by means of momentum transferred from the rotating fluid medium in the acoustic cavities 15 and 16. The rotation of the fluid medium is generated by directing the fluid flow towards one side of the acoustic cavities 15 and 16 as it enters through the inlet ports 17 and 18, respectively. This tangential entrance of the fluid is particularly evident from FIG. 2.

The operation of the coupling arrangement for the acoustic vibration generator 1, as shown in FIGS. 1 to 3, may be better understood if the operation of acoustic vibration generators discussed in United States Letters Patent No. 2,792,804 is reviewed. Consider that a steady flow of fluid under pressure from an external source is established through the acoustic generator when the free-floating valve 13 is in the equilibrium position, i.e., in a position such that the pressure in both cavities 15 and 16 are equal, as shown in FIG. 1. In such a quiescent state, the pressure drop across the annular orifices 36 and 37 of the stationary port 12 is equal and there is no net thrust tending to displace the position of the valve 13 or the coupling pistons 20 and 21. The rod-like connecting means 70, in accordance with this invention, by supporting the equal but oppositely directed average forces on pistons 20 and 21, maintains the coupling piston structure statically balanced. If the valve 13 should now be subjected to an incremental movement from its equilibrium position, such as might derive from turbulent flow in the orifice region, resulting at some instant, for example, in an incremental displacement of the valve towards cavity 15, as shown in FIG. 3, there will result a deceleration of the fluid flow through acoustic cavity 15 accompanied by an increase of local pressure in acoustic cavity 15, while in acoustic cavity 16 there will result an acceleration of the fluid flow accompanied by a reduction of local pressure.

The higher instantaneous pressure in cavity 15 and the lower instantaneous pressure in cavity 16 exerts a net force increment on the valve 13 directed opposite to the above assumed incremental displacement of valve 13.

This oppositely directed incremental force will only tend to increase the above assumed displacement. This result derives from the fact that a mass, such as valve 13, when subjected to an oscillatory force field, will have its acceleration in phase with the applied force while its displacement will be 180° out of phase with the applied force. An incremental displacement of the valve 13 thus will be accompanied by asymmetrical or push-pull pressure changes in cavities 15 and 16 reacting on the valve 13 to accentuate the given displacement and, consequently, the driving force exerted on valve 13. This above statement illustrates the regenerative nature of the valving action. If the losses in the acoustic circuit of the generator are not too high, this regenerative feature will allow oscillations to build up and be sustained at a frequency for which the acoustic reactance, seen looking into the cavities 15 and 16 from the orifices 36 and 37, is equal but of opposite sign to the acoustic reactance presented by the valve 13. The acoustic reactance presented by the acoustic cavities 15 and 16 depends not only upon the elastic compliance of the contained fluid but also upon the impedance presented to these cavities by the output coupling pistons 20 and 21.

At the oscillation frequency the orifices 36 and 37 look into a resistive load which is made up in part by the internal losses of the system and in part by the external load presented to pistons 20 and 21. It is evident that, for efficient operation, the load presented by internal losses should be a small fraction of the external load.

Oscillations will be sustained at an oscillation amplitude for which the positive acoustic resistance seen by the orifices equals the negative resistance presented by the flow modulated by the valving action. As the fluid flow through the orifices 36 and 37 is a non-linear function of orifice pressure differential and orifice area, a negative resistance can generally be obtained for some value of supply pressure and for a given load resistance for which oscillations will commence and stabilize at an optimum design amplitude. The resulting stable asymmetric pressure variations developed within the generator cavities then operate on interconnected pistons 20 and 21 to deliver a net acoustic force against some applied acoustic load.

In summary then, the generation of acoustic energy by generator 1 and the transfer of a portion of this energy to an external load is accomplished by a regenerative valving action which generates a self-sustaining oscillation of the free-floating valve 13, thereby modulating asymmetrically the flow through orifices 36 and 37 and causing push-pull pressure variations to exist in cavities 15 and 16. These push-pull pressure variations not only operate on freely moving pistons 20 and 21 to move dynamically the rigid coupling means 2 comprising elements 20, 70, 21 to convey energy to an external load, but, in addition, react back on the exposed faces of valve 13 to sustain the action of the generator. Under optimum design conditions, a major portion of the acoustic energy generated by the valving action is transferred through the motion of coupling pistons 20 and 21 to an external energy receiver while the remaining portion of the generated energy is reflected by coupling pistons 20 and 21 to sustain the oscillation of the free-floating valve 13.

FIGURE 4 illustrates an acoustic vibration generator in which the stationary port structure 12 and the valve 13 have been designed such that the cross-sectional area of the valve 13 is substantially equal to the radial cross-sectional area of the bore of housing 11 in order to prevent a net axial force from being exerted upon the housing. The elements in FIG. 4 corresponding to those of FIGS. 1 to 3 are designated by similar reference numerals. The acoustic generator 1 of FIG. 4, like that of FIGS. 1 to 3, includes a housing 11, a stationary port structure 12, a free-floating valve 13, acoustic cavities or chambers 15 and 16, inlet channels 26 and 27 terminating in respective inlet ports 17 and 18, and an exhaust port 50 at one end of an exhaust channel 51. The radial fins 57 of FIGS. 1–3 have been modified slightly and are generally designated as radial fins 57*a* in FIG. 4 as well as in FIGS. 8 and 12–14, inclusive.

The radial fins 57 and **57*a* do not form any part of this invention. The port structure 12 is formed by providing a recess 32 in the cylindrical housing 11. Orifices 36 and 37 are formed in the space between the outer rims 43, 47 of valve 13 and the projecting rims 45 and 44 of the housing 11, respectively at the corresponding extremities of recess 32. The recess 32 serves as a discharge or exhaust port through which the fluid flows in returning by way of the exhaust port 15 and exhaust channel 51** to the low pressure side of the fluid pump.

With the arrangement shown in FIG. 4, the axial forces developed in the cavities 15 and 16 during modulation of the fluid flow by the valve 13, will not be exerted upon housing 11, as in the case of the device of FIGS. 1 to 3, since the net applied force on the moving coupling members (pistons 20 and 21) is exactly balanced by the inertial reaction of valve 13. This absence of thrust exerted on the housing may be of value in such applications as a jack hammer, shown in FIG. 13 and described subsequently. This feature, however, may be used with any of the devices described in this application.

It is possible to apply the techniques of the present invention to a plurality of acoustic vibration generators in either a series or parallel array. FIG. 5 discloses a plurality of serially-connected and concentrically aligned acoustic vibration generators. Two complete generators, namely, generators 201 and 202, are shown in FIG. 5; each of these generators is similar to the generator shown in FIGS. 1 to 3. The coupling means 250 for generator 201 includes coupling pistons 203 and 204 and rigid connecting means 206; while the coupling means 251 of generator 202 includes pistons 204 and 205 and rigid connecting means 207. The serial connection of the coupling means 250 and 251 of the two generators is achieved through coupling piston 204 which is common to the two generators. Portions of two other generators 210 and 212 are shown at either end of generators 201 and 202 and may be used in conjunction with the latter generators, if required. Any number of generators can be connected in tandem, as long as the composite coupling structure can move at the oscillation frequency substantially as a rigid body. An inlet channel 240 conveys pressurized fluid to the acoustic generators 201 and 202 and an exhaust cavity 241 provides a return passage for the exhaust fluid medium.

The serially-connected acoustic vibration generators 201 and 202 and the corresponding composite coupling arrangement may be preferred in some instances in that more power can be concentrated in a smaller cross-sectional area and also because the acoustic vibration generator combination possesses an inherent and simple capability of synchronization.

The operation of the serially-connected acoustic generators 201 and 202, as shown in FIG. 5, is generally similar to the operation of a single acoustic generator. The valves 231 and 232 may oscillate at frequencies for which the acoustic reactance of a given valve equals but is of opposite sign to the acoustic reactance seen looking at the generator cavities 215 and 218 from annular orifices 236 and 237 of the respective generators 201 and 202. As in the generator 1 of FIGS. 1 to 4, the coupling pistons 204, 205 and 206 reflect back a portion of the acoustic energy to the cavities 215, 216, 217 and 218 to sustain the valves 231 and 232 in oscillation, thereby keeping the acoustic generators 201 and 202 operative.

So long as the acoustic constants of both generators 201 and 202 are essentially identical, the interchange of acoustic energy between them to coupling pistons 203, 204 and 205 will tend to lock them in at the same frequency. However, two basic modes for the two generators 201 and 202 exist. One mode is that for which the valves 231 and 232 move in phase opposition. In this case, the net thrust developed on piston 203 and the left side of piston 204 by virtue of pressure variations in cavities 215 and 216 is equal but of opposite sign to the net force exerted on piston 205 and the right side of piston 204. As a result, the net force exerted on the composite piston structure is zero and no acoustic energy is coupled out of the composite generator system. The other basic mode is that for which the valves 231 and 232 move in phase synchronism, giving rise to pressure variations in the corresponding cavities of the two generators 201 and 202 which exert in-phase forces on the corresponding faces of the composite piston coupling structure; in this mode, the sum of the forces developed in each of the cavities add to develop a net thrust on the coupling pistons to transfer acoustic energy to an external energy receiver.

In order that the mode for which the valves 231 and 232 move in phase may be naturally selected over the mode for which the coupling arrangement does not move, means may be provided for short circuiting the in-phase pressure variations in cavities 216 and 217 at the frequency of the undesired mode. This means may take the form, for example, of a fluid channel 238 interconnecting the cavities 216 and 217 of generators 201 and 202, respectively, as shown in FIG. 5. The length of channel 238 between cavities 216 and 217 in which the in-phase pressure variations are to be avoided may be equal to odd multiples of a half-wavelength for compressional wave transmission along the channel 238 at the frequency of the undesired mode. So long as the two possible modes are not widely separated in frequency, the above specified channel 238 will yield an inlet impedance as seen by the respective cavities 216 and 217 which will be low at the undesired mode, thereby suppressing the latter mode, and high at the desired mode, thereby not appreciably affecting it.

Once synchronization has been established between the two acoustic generators 201 and 202, the coupling pistons 203, 204 and 205 and connecting means 206 and 207 will deliver acoustic power to an energy receiver from generators 201 and 202 equal to the algebraic sum of the available acoustic power generated within the acoustic cavities 215 and 216 of generator 201 and the available acoustic power generated within the acoustic cavities 217 and 218 of generator 202. The energy receiver may, for example, be a pile driver, drill or vibrating attachment for processing foods, chemicals or metals.

Figure 6:
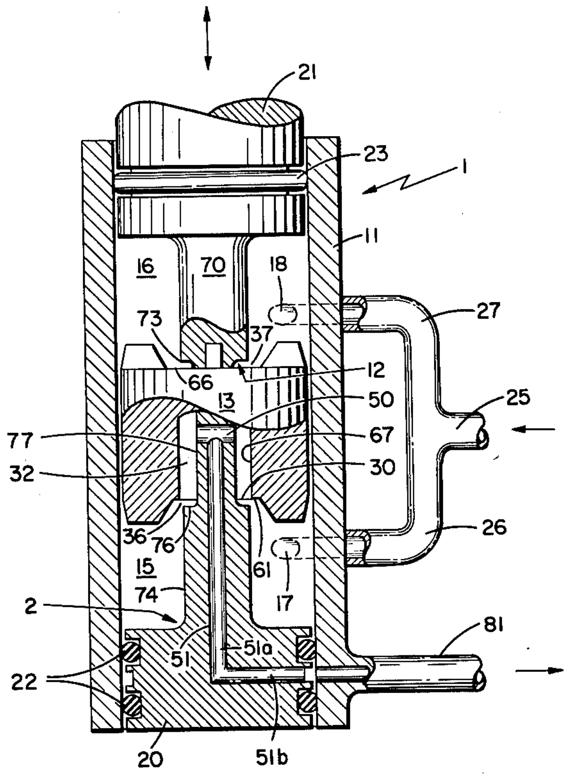
FIG. 6 is a view, mainly in central longitudinal cross-section, of another embodiment of the invention wherein the relationship between the valve and that stator port region is modified to provide amplification of the valve orifice opening, for a given valve displacement.

FIG. 6 shows another embodiment of the invention which includes means for amplifying the orifice area variation. Elements corresponding with those of FIGS. 1 to 4 will be indicated by the same reference numerals. The stationary port structure 12 is formed by providing a recess in the central portion of the connecting means 70. The amplification of orifice area variation results from the oppositely directed displacement of the free-floating valve 13 and the rod-like connecting means 70, when both move in phase opposition in response to the driving pressures generated in acoustic cavities 15 and 16. The variable orifices 36 and 37 are formed partly by free-floating valve 13 and partly by connecting means 70. The variable annular orifice 36 is partially defined by the sharp edge at the intersection of surface 61 of valve 13 and the inner surface 67 of the valve, and partially by the sharp edge at the intersection of the surfaces 74 and 76 of connecting means 70. Likewise, the variable annular orifice 37 is formed by the edge 66 of valve 13 and the edge 73 of connecting means 70. The exhaust cavity 32 encompasses the region bounded by the surface 67 of valve 13 and the surface 77 of connecting means 70.

The hydraulic circuit is essentially similar to the acoustic generators heretofore described, with modifications that are necessary to employ the orifice amplification technique. A fluid medium under pressure enters inlet channel 25 and passes through lower channel 26 and upper channel 27, whence it enters acoustic cavities 15 and 16 through inlet ports 17 and 18, all respectively.

The fluid flow is throttled through orifices 36 and 37 into discharge cavity 32 at a lower pressure and continues into an exhaust port 50 and then into an exhaust channel 51. The exhaust channel may include an axial bore 51*a* in the connecting means 70, and a bore 51*b* in piston 20 and in housing 11. From exhaust channel 51, the fluid passes through exhaust outlet channel 81. Two O-rings 22 are now provided on the coupling piston 20 disposed diametrically opposite the housing exhaust port to prevent fluid leakage.

The ratio of the displacement of valve 13 to the displacement of the coupling arrangement 2, when acted upon by the push-pull pressure variations developed in cavities 15 and 16, is in a reverse ratio to the effective mass reactance presented by the valve 13 and coupling pistons 20 and 21. The approximate oscillation frequency of the acoustic generator 1, described in FIG. 6, may be determined by the condition that the sum of the acoustic stiffness reactances of the two cavities 15 and 16 equals the parallel combination of the acoustic mass reactance of the valve 13 and the coupling arrangement 2.

The device of FIG. 6, like that of FIG. 1, is characterized in that the driving areas of the coupling pistons 20 and 21 equal the driving area of the valve 13, so that no net variational thrust will be transmitted to the generator housing 11.

Figure 7:
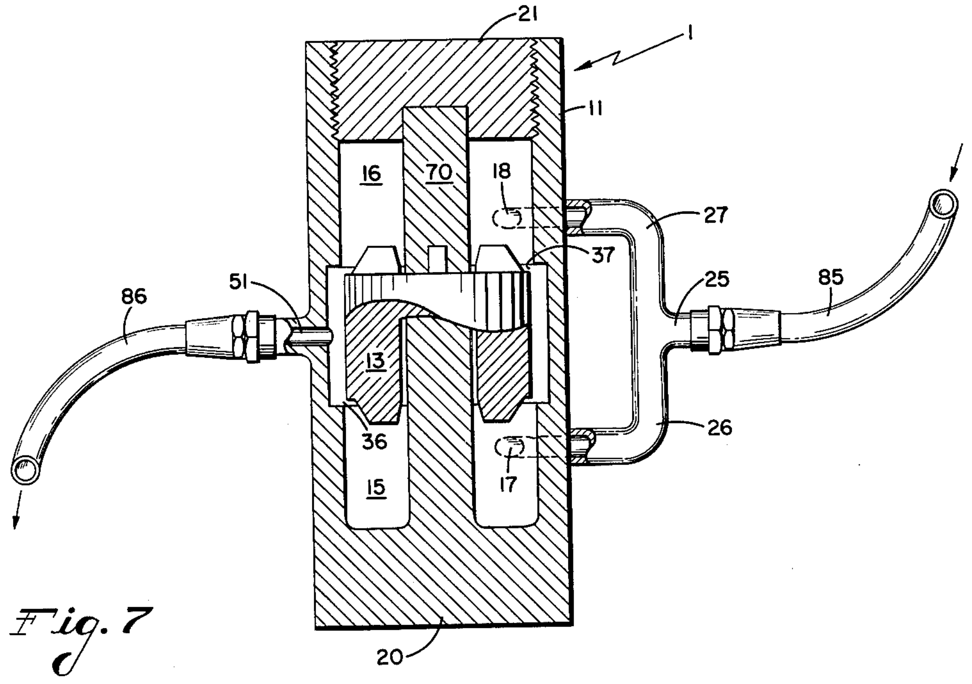
FIG. 7 is a central longitudinal cross-section view of a further embodiment of the invention illustrating the coupling members as forming an integral part of the generator housing.

Another embodiment of the invention is shown in FIG. 7, wherein the entire housing 11 of the acoustic generator 1 may be set into acoustic vibration. As shown in FIG. 7, the coupling pistons 20 and 21 may be threaded and securely fastened to the generator housing 11 and the driven cross-sectional area of these pistons may be equal to the driven cross-sectional area of the free-floating valve 13. In these circumstances, the net force applied to the housing equals the net force applied to the valve. The free-floating valve 13 may be freely guided by the connecting means 70, although other guidance means, such as those stated in the copending application Serial No. 747,159, now Patent No. 3,004,-512, may be used. If other suitable guidance means are provided, the connecting means 70 often may be omitted.

The hydraulic circuit of the embodiment of the invention shown in FIG. 7 is generally similar to that shown in FIGS. 1 to 4. Flexible tubes 85 and 86 are clamped to the respective inlet channel 25 and exhaust channel 51, illustrating one means for isolating movement of the generator relative to the fluid pressure connections.

The operation of the acoustic generator 1 of FIG. 7 is generally similar to that described with respect to FIGS. 1 to 6. The approximate oscillation frequency of the generator may again be determined by the condition that the sum of the stiffness reactances of the two cavities 15 and 16 equals the parallel combination of the mass reactances of the valve 13 and of the housing-coupling structure 20, 11, 21.

Figure 8:
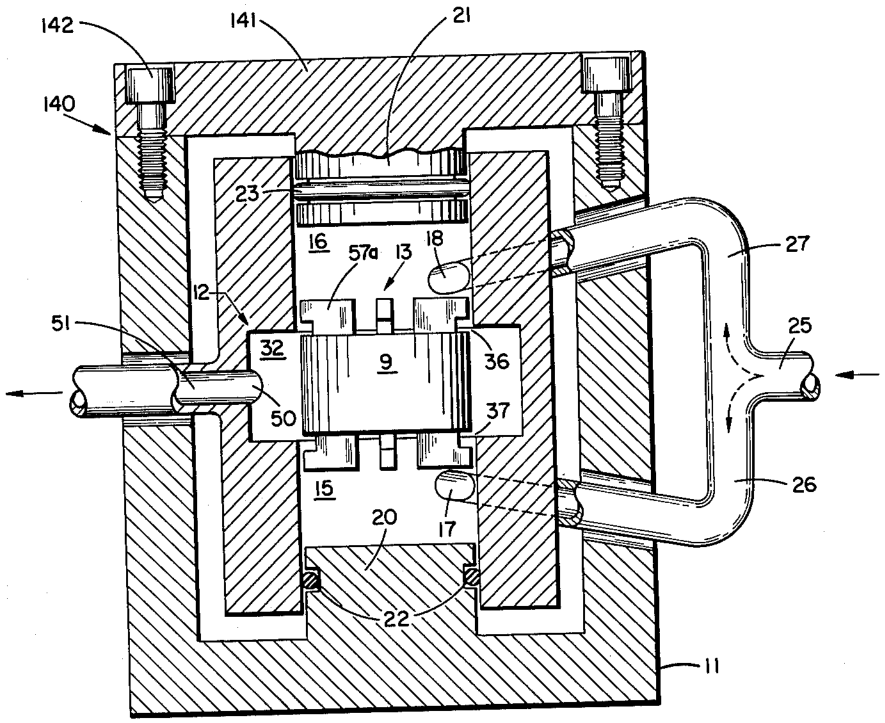
FIG. 8 is a view, partly in central longitudinal section, showing a modification of the generator of FIGS. 1–3 wherein a portion of the coupling arrangement is disposed external to the generator housing.

FIG. 8 discloses an acoustic vibration generator wherein the connecting means 140 is disposed external to housing 11. The external coupling means 140 may include an end portion 141 which is an extension of piston 21 secured by fastening means such as bolts 142 to a generally cup-shaped housing 11 of which piston 22 is also an integral part. The valve 13 may include a plurality of radially extending feet 57 which slidably contact the inner periphery of the stationary port structure 12. The port structure of FIG. 6 may be used in the device of FIG. 8, if amplification of orifice opening is desired. By removing the internal connecting means, pressure waves in cavities 15 and 16 may be exerted upon the entire surface of pistons 20 and 21, since there is no central portion of the piston connected to an internal connecting means.

Figures 9, 10, 11:
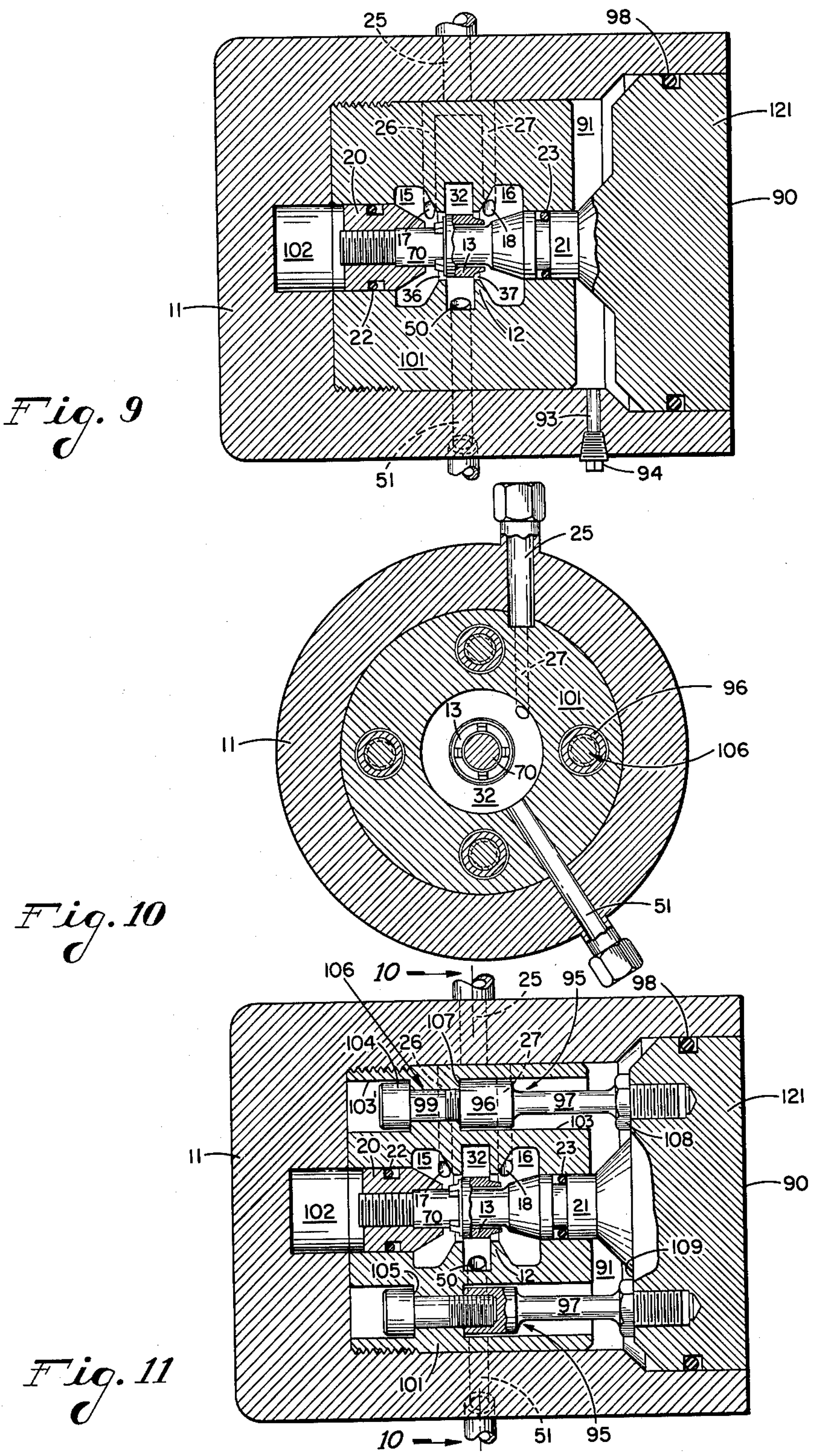
FIG. 9 is a section view illustrating a modification of the generator of FIG. 8 wherein one of the oppositely disposed piston-type members terminates in a driving element of considerably different size than that of the other piston-type member and wherein a backing compliance is introduced.
FIG. 10 is a transverse section view of an acoustic vibration generator, taken along line 10—10 of FIG. 11, which differs from that of FIG. 9 principally in that it includes a plurality of mechanical stiffeners.
FIG. 11 is a longitudinal section view of the acoustic vibration generator of FIG. 10.

Referring next to FIG. 9, an acoustic vibrator generator 1 is shown which incorporates versatile means for achieving simultaneously an optimum impedance match as well as maximum power transfer between the oscillator power converting orifices and an external load. In addition, the structure is so designed as to provide, if desired, a biasing force to maintain a fixed average position of the coupling means, as the latter may, in some modifications, be normally free of mechanical constraint. The biasing force can also help to minimize a possible internal cavitation problem.

The oscillator of FIG. 9 is identical in many respects with the oscillator of FIG. 1. The principal differences which give rise to the above-named impedance and energy transfer characteristics result from the introduction of an area transformation between the driving pistons and the radiating piston member, and the inclusion of a backing compliance to resonate with the mass of the aggregate piston coupling structure.

The oscillator includes a more-or-less cup-shaped housing 11 having one end of a bore threaded for fixedly attaching a cylindrical block 101 whose outer diameter is substantially equal to the inner diameter of the bore in housing 11. The housing 11 and block 101 are provided with suitable passages for the flow of fluid. In addition, block 101 is provided with a stationary port structure 12, valve 13, pistons 20 and 21 and connecting means 70, together with cavities 15 and 16, as in FIGS. 1 to 4. The block 101 includes cylindrical bores within which the pistons 20 and 21 may move. Housing 11 also contains a cylindrical enclosure or chamber 102 to act as a termination to piston 22. This chamber 102 may be filled with a suitable fluid to serve either as a pressure release or fluid compliant termination, as desired.

The hydraulic circuit of the oscillator of FIG. 9 may be traced as follows. Hydraulic fluid under pressure enters at inlet 25 to flow through two lines 26 and 27 to issue at ports 17 and 18 into oscillator cavities 15 and 16. The length of these feed lines may be of the order of a quarter wavelength in the contained fluid at the oscillation frequency in order isolate the acoustic circuit of the oscillator from the steady flow source.

The fluid, upon filling cavities 15 and 16, issues through annular variable area orifices 36 and 37, formed between the outer rims of annular valve 13 and the rims of stationary port structure 12, to discharge into cavity 32. The discharge cavity 32 is connected to output port 50 in channel 51 from which the fluid returns to the source.

The valve 13 is free to move back and forth along coupling 70 which joins rigidly the two piston couplers 20 and 21. During oscillation, the valve 13 will alternately open and close orifices 36 and 37. It has been mentioned that with a massive valve 13 of the configuration illustrated in FIG. 1, motion of the valve at the oscillation frequency will be accompanied by pressure variations in cavities 15 and 16, arising from the modulation of the flow through orifices 36 and 37, which tend to sustain the valve motion. The oscillation frequency can again be shown to be that for which the acoustic mass reactance of the valve equals the net stiffness reactance seen looking into cavities 15 and 16.

If we assume that an oscillation has commenced in the acoustic circuit of the device of FIG. 9, then as the valve moves to the left-hand cavity 15 the instantaneous pressure therein will be increasing while the instantaneous pressure in the right-hand cavity 16 will be decreasing. Such pressure variations about the average supply pressure will tend to operate on drive piston 20 and 21 to exert a force on these pistons in a push-pull manner. As drive pistons 20 and 21 are assumed to be coupled rigidly by interconnecting rods 70, the arithmetic sum of the acoustic forces operative on pistons 20 and 21 will then drive the composite piston coupling means, including the enlarged portion 121 of piston 21, otherwise referred to as a radiating element, resulting in motion of the output coupling face 90. A hydraulic seal is maintained between the radiating element 121 and the housing 11 by an O-ring 98. The motion of the output coupling face 90 transfers acoustic energy from the oscillator to an external load, such as a fluid medium in contact with face 90.

As a result of the reduction in area between face 90 and the drive faces of pistons 20 and 21 in the device of FIG. 9, acoustic energy is coupled from the oscillator cavities 15 and 16 at high energy density effective over a relatively small drive area to the external load at a lower energy density extending over a larger radiating area. This direction of area transformation is useful when coupling acoustic energy from the oscillator to open bodies of fluid where it is desirable not only to avoid cavitation at the transducer face but also to achieve a high value of radiation resistance for efficient operation. On the other hand, as will be seen later in connection with the device shown in FIG. 14, the reverse area transformation is sometimes advantageous as, for example, in fluid processing or drilling; in these instances, energy is accepted from the oscillator at relatively high energy density and then concentrated to a further degree at the bit or processing region.

The cavity 91 of FIG. 9 behind the output coupling piston 121 is shown fluid-filled and surrounded by solid walls exhibiting high rigidity. This fluid may be the same hydraulic oil employed as the oscillator fluid or possibly a high compliance silicone oil. The fluid in cavity 91 acts as a complaint backing reactance to cancel a portion, if not all, of the mass reactance presented by the composite piston coupler.

For a given piston coupler and radiation load, the load impedance presented to the oscillator cavities will depend upon the relationship between the resonant frequency of the piston coupler mass and the backing cavity compliance and the nominal oscillation frequency. The impedance presented by the load to the oscillator cavities can thus be defined only upon specifying in combination the area of piston face 90, the value of the radiation load, the mass of the composite piston, the mass and driving area of the valve 13, the area of the drive pistons 20 and 21, and the volume and fluid characteristics of both the oscillator cavities 15 and 16 and the fluid backing cavity 91. This large number of interrelated design factors generally permits one to obtain with reasonable ease not only an optimum impedance match but also a condition of maximum power transfer between the load and the oscillator source for a given power level.

It can be readily shown that the condition of maximum power transfer will occur when the resonant frequency of the piston mass and backing compliance is equal to the oscillation frequency. In order for the oscillation frequency to coincide with the resonant frequency of the loaded coupling structure, the following relationships must apply $$R^2_{AL}=\frac{M_{AP}}{C_{AC}}=\frac{M_{AV}}{C_{AP}} \qquad (1)$$

$$\omega_0^2=\frac{1}{M_{AV}C_{AC}}=\frac{1}{M_{AP}C_{AV}} \qquad (2)$$

In Eq. 1, $R_{AL}$ is the acoustic resistance (ratio of acoustic pressure to acoustic volume velocity) presented at resonance by the driving pistons 20 and 21 to the acoustic cavities 15 and 16. $R_{AL}$ derives from the resistive portion of the load impedance presented to the face 90 of radiating piston 121, appropriately modified by the area transformation between piston face 90 and the drive pistons 20 and 21. $M_{AP}$ and $M_{AV}$ are, respectively, the acoustic masses, referred to the drive cavities 15 and 16, of the composite coupling piston 20, 70, 21, 121 and of the valve 13. $C_{AC}$ and $C_{AP}$ are, respectively, the acoustic compliance of the fluid contained in drive cavities 15 and 16, and the compliance, as referred to these cavities, of the elastic element 91 backing the radiating piston member 121. The quantity $\omega_0$ is defined as the radian resonance frequency of the acoustic mass of the valve with the acoustic compliance of the fluid contained within cavities 15 and 16; $\omega_0$ is also defined to be simultaneously the resonance frequency of the coupling piston mass with its backing compliance.

The oscillator frequency will coincide with $\omega_0$ when Eqs. 1 and 2 are satisfied. In these circumstances, the condition of maximum power transfer between the oscillator orifice and the radiation load is achieved for any given acoustic driving pressure in the oscillator cavities. On the other hand, if, for example, Eq. 2 is satisfied while Eq. 1 is not; i.e., if $$R^2_{AL}<\frac{M_{AP}}{C_{AC}}=\frac{M_{AV}}{C_{AP}} \qquad (3)$$

then it can be shown that two oscillation frequencies are possible, neither one corresponding to $\omega_0$, one being lower than $\omega_0$ and the other being higher than $\omega_0$. In these circumstances the condition of maximum power transfer is not obtained, and, in fact, the oscillator can be shown to select that mode for which a relative minimum of power transfer will occur. The condition of Eq. 3 is therefore generally undesirable, and should be avoided whenever possible.

Although in the above discussion the drive areas of pistons 20 and 21 have been assumed implicitly to be equal, they need not be, and, in fact, are so illustrated in FIG. 9. Thus, in contrast with the device of FIGS. 1 to 4, the piston coupler assembly of FIG. 9 is not necessarily balanced statically, and can exhibit, for example, a net static thrust directed toward the rear of back cavity 91. Cavity 91 is filled, as before stated, with a resilient fluid which may be inserted through an inlet 93 and sealed off by plug 94. Since cavity 91 is fluid filled and sealed by an O-ring 98, the static pressure in cavity 91 will rise in response to the thrust on the piston until a balance of forces is achieved. This static bias of the piston against back cavity 91 is useful to avoid dynamic cavitation in cavity 91, and also to establish a positive equilibrium position of an otherwise free piston. The bias is also useful to support the weight of the piston coupler when the oscillator is mounted vertically, as in the drill of FIG. 13.

It is to be noted that, in accordance with a main feature of the invention, the generator of FIG. 9 does not require the bending or extension of any solid mechanical member in order to perform in the intended manner. In fact, the energy coupling structure of the generator preferably moves as a rigid body, and where compliant members are needed to satisfy operational requirements fluid compliant elements are employed. These fluid elements exhibit a distinct advantage over mechanically compliant structures in that they are not subject to permanent fatigue failure under repeated stress.

Mechanically compliant elements are useful in some instances, however, and an example of their use is illustrated in FIGS. 10 and 11. The principle of operation of this generator is essentially identical with the device of FIG. 9. However, cavity 91 is intended, in this instance, to be filled with gas rather than with liquid. The desired backing stiffness for piston 121 is now obtained, not from the fluid in cavity 91, but by a plurality of mechanical stiffeners or studs 95.

In the acoustic vibration generator 1 of FIGS. 10 and 11, the cylindrical block 101 includes, in addition to a hydraulic circuit, a plurality of bores 103 and 103' for receiving mechanical studs 95 and bolts 106, respectively. Each of the studs 95 consists of a portion 97 having an integral enlarged portion 96 at one end which rests against a shoulder 107 in bore 103. The other end of the stud 95 remote from the head 96 threadably engages the enlarged portion 121 of piston 21; a nut 108 rests against the back wall 109 of the enlarged portion 121 of piston 21. The bolt 106 includes a shank 99 threaded into the head portion 96 of stud 95 as well as a head 104 which bears against the shoulder 105 in bore 103'. The bolt 106 serves as a means for supporting the studs 95.

The piston coupler 20, 70, 21 thus drives radiating element 121 which, in turn, is supported mechanically from the housing 11. The resonant frequency of the mass of element 121 and its fluid load with the stiffness of the studs 95 is normally made coincident, as mentioned before with reference to Eqs. 1 to 3, with the natural oscillation frequency of the oscillator. In these circumstances, maximum power transfer between the oscillator orifices and the external load will result.

The choice of mechanical stiffness members 95 over a liquid spring, such as the liquid-filled cavity of FIG. 9, may be dictated by considerations of cavitation. In the event that the oscillator is to operate at ambient pressures near atmospheric pressure, signal pressures in liquid-filled cavity 91 may be sufficient to cavitate the contents of that cavity. In this case, it is desirable to replace the liquid spring by a mechanical equivalent and to fill cavity 91 with gas. On the other hand, if the oscillator is to be operated at sufficient submergence depths, where cavitation can be suppressed, then the liquid spring may be desirable. In particular, for applications at great submergence depths, where hydrostatic pressures are high, the liquid spring exhibits substantial advantages. The free piston in the device of FIG. 9 automatically adjusts its position so that the hydrostatic forces acting on the front and back faces of element 121 are equal. In addition, the liquid in cavity 91 of FIG. 9 forming the spring is not subject to compressional fatigue, as would be the case with the mechanical studs 95 of FIG. 11, if the latter were to support the static hydrostatic force in addition to the dynamic movement of radiating element 121. Consequently, with a liquid compliant backing to the piston radiator 121, there is no practical limit to submergence depths.

Figure 12:
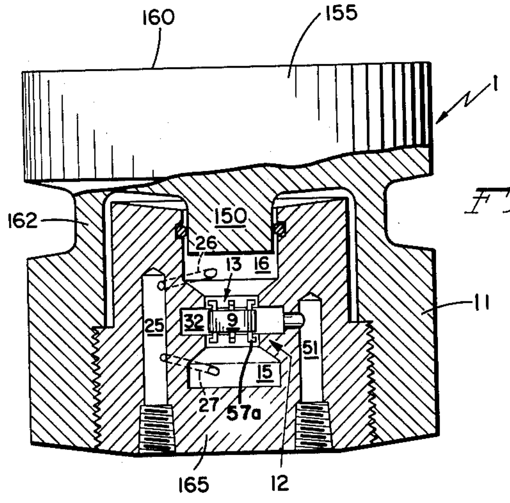
FIG. 12 is a section view of an acoustic vibration generator utilizing a single piston.
Figure 13:
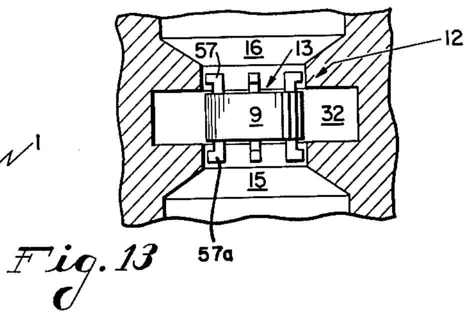
FIG. 13 is an enlarged section view of the valving region of the device of FIG. 12 showing the control valve in its center or equilibrium position.
Figure 14:
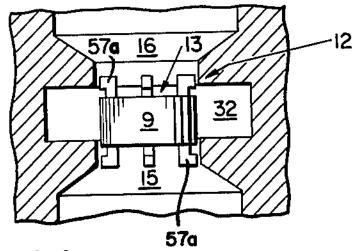
FIG. 14 is an enlarged section view of the valving region of the device of FIG. 12 showing the control valve in an offset position.

Referring now to FIGS. 12 to 14, an acoustical vibration generator 1 is shown which uses a single piston 150 having an enlarged portion or radiating element 155 bounded partially by a driving face 160. The housing 11 is connected to the enlarged portion 155 of the piston 150 by a relatively compliant annular portion 162. A block 165 of generally cylindrical configuration is secured to housing 11 and contains passages 25, 26, 27 and 51 which form a portion of a hydraulic circuit. The equilibrium or center position of valve 13 is shown more clearly in FIG. 13, which is an enlarged view of the valving region. As pressures vary in cavity 16 by the valving action previously described, movement of piston 150 and the enlarged portion 155 thereof occurs. The compliance of the annular portion 162 performs the same function as the liquid-filled cavity 91 of the device of FIGS. 9 and 10 and the mechanical studs in the device of FIG. 11, and is generally set so that the mass of the piston and its radiation load is in resonance with the compliance of annular element 162 at the oscillation frequency, as explained in connection with the device of FIG. 9. FIG. 14 clearly shows the valve 13 in one of its offset positions, corresponding to the position of valve 13 of the device of FIG. 1, as shown in FIG. 4.

The device of FIGS. 12 to 14, unlike that previously described and illustrated, exhibits single-ended coupling; that is, the acoustic force on piston 150 is derived from pressure variations in chamber 16 only, as contrasted with the devices of FIGS. 1 to 11 wherein the force on the load is derived from asymmetrically varying pressures exerted in both chambers. The device of FIG. 12 offers certain advantages at relatively high frequencies of operation over the devices shown in FIGS. 1 to 11. At such high frequencies, the mass of the valve and the compliance of the cavities must be small. In fact, the dimensions required of the cavities 15 and 16 and the valve 13 may become so small that the permissible size of the rod-like coupling means 70 in FIGS. 1 to 11 may not provide the necessary rigidity for satisfactory push-pull coupling of energy to the radiating member. At relatively low frequencies, however, the displacement of elastic portion 162 may become so large, for a given energy level, that the fatigue limit of the material is exceeded. In such cases, the devices shown in FIGS. 1 to 11 may be preferable to the device of FIG. 12.

It should be noted that, although the device of FIG. 12 embodies a single-ended coupler, a certain amount of energy available in the chamber 15 may be coupled through the valve mechanism 13 to the piston 150 and integral radiating element 155. The degree of this coupling will depend upon the relative magnitudes of the acoustic impedance of valve 13 and the radiation impedance presented to chamber 15 through coupling piston 150.

When the acoustic impedance presented by the moving valve is of about the same order of magnitude as, or is greater than, the acoustic radiation resistance presented by piston 150 to cavity 16, it may be found preferable to use the system of FIGS. 1 to 11 rather than the system of FIG. 12.

Figure 15:
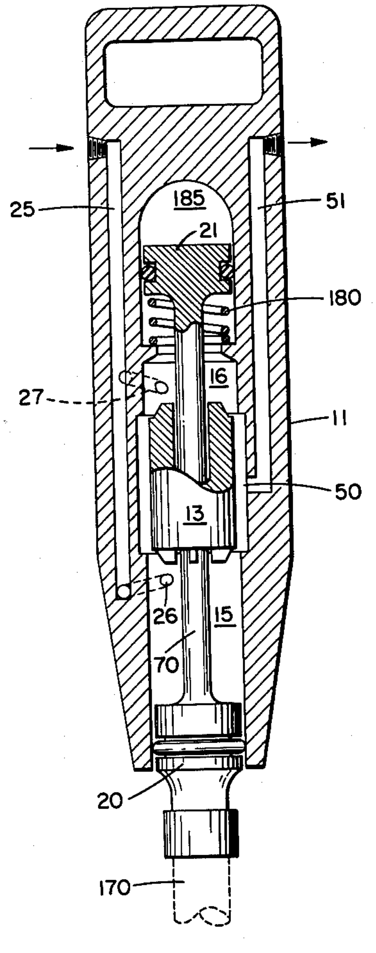
FIG. 15 is a central cross-section view of a jack hammer utilizing certain principles of operation already described.

FIG. 15 is a schematic representation of a drill assembly in which drive piston 20 is attached to a drill bit 170. It is to be noted that, in this instance, the driving areas of pistons 20 and 21 are the same as the driving area of valve 13. Consequently, force transmitted to the bit 170 is balanced by the inertial reaction force developed by the motion of valve 13, and a minimum of vibrational energy is transmitted to the housing 11. As a result, housing 11 may be made of lightweight material, thus minimizing the overall weight of the system. In addition, since little vibratory energy can be transmitted to the housing, operator fatigue will be minimized in the event that the device is to hand-held, or in the event that little acoustic energy dissipation in the structure supporting the housing can be tolerated.

The spring 180, as illustrated in FIG. 15, is intended to bias the free piston coupler assembly against the gas-filled chamber 185. As a result, the piston coupler is held statically within the housing and cannot fall out of its own weight. The presence of gas chamber 185 permits a static thrust to be applied against bit 170 through force applied at piston 20, while decoupling or filtering the dynamic movement of the piston from housing 11.

Figure 16:
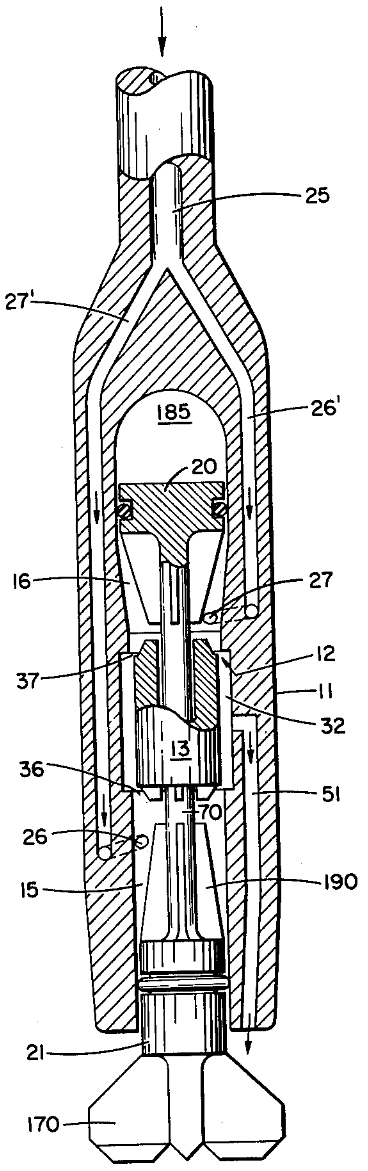
FIG. 16 is a central cross-section view of an embodiment of the invention including a rotary bit particularly adapted for use in drilling oil wells.

FIG. 16 illustrates the application of the principle of the invention to a rotary oil-well drill. As in the device of FIG. 13, the fluid passes through longitudinal passages within the housing 11. The fluid entrance passage 25 is disposed at one end of the housing and connects with longitudinally disposed passages 26' and 27' and tangentially disposed passages 26 and 27 for supplying fluid to respective cavities 15 and 16. The passages 26 and 27 are oriented so that the fluid directed against the fins 190 at both ends imparts rotation in the same direction to the free piston drill structure 20, 70, 21, 170. The discharge cavity 32 in the region of the stationary port structure 12 connects to a longitudinal passage 51 in housing 11. As previously stated in connection with the device of FIGS. 1 to 3, it is desirable to isolate the acoustic circuit of the generator from the pump. This can be accomplished by making the lengths of the inlet passages as nearly equal as possible, and preferably a quarter wavelength long at the operating freqeuncy. At relatively low operating frequencies, however, this path length becomes large. By introducing the fluid into the acoustic chambers from ducts disposed on opposite sides of the longitudinal axis of the housing, the necessary length of passages for proper isolation may be obtained. This principle can be used in the device of FIG. 15 also. The fluid passing through discharge passage 51 is directed upon the drill bit 170 of FIG. 16 and provides means for cleaning debris from the drill bit during the drilling operation.

The device illustrated in FIG. 16 differs in one respect from the device of FIG. 15 in that the drive area of piston 20 is larger than the drive area of piston 21. As a result, equal static fluid pressure in cavities 15 and 16 exert a net static thrust against free piston assembly 20, 70, 21 to force the piston 21 against the fluid contained in cavity 185. In this instance, the effect of the area unbalance replaces the effect of the spring 180 in FIG. 15.

Cavity 185 in FIG. 16 may be gas or liquid filled. In the event that it is liquid-filled, the liquid volume may be chosen so that the resonant frequency defined by the mass of piston assembly 20, 70, 21 and bit 170 in cooperation with the stiffness of liquid spring 185 falls in the vicinity of the oscillation frequency. In this event, the large mass reactance presented by the bit and piston is partially, if not exactly, canceled by the liquid spring, and the net impedance presented to the oscillator cavities 15 and 16 can be lower than the impedance presented by the piston in the absence of liquid spring 185. This result may be useful in obtaining an optimum impedance match for maximum energy transfer between the oscillator and the variable load impedances that one encounters in drilling environments.

Figure 17:
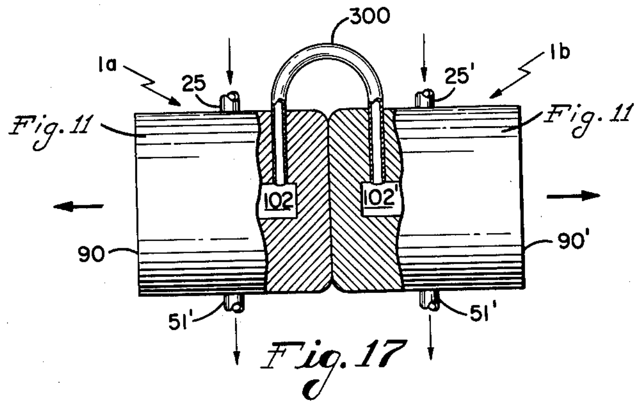
FIG. 17 is a view showing a pair of acoustic vibration generators, such as shown in FIGS. 9–11, suitable for radiation of acoustic energy in opposite directions.

In FIG. 17, two acoustic vibration generators 1*a* and 1*b*, which may be of the type shown in FIGS. 9 and 10, are arranged back-to-back with an acoustic transmission line 300 passing through the respective housings 11 and 11' interconnecting the cylindrical enclosures or cavities 102 and 102' of the generators 1*a* and 1*b*, respectively. The light arrows indicate the direction of flow of fluid into the respective inlet channels 25 and 25' and out from the respective exhaust channels 51 and 51' of the generators 1*a* and 1*b*. The heavy arrows indicate the general direction of propagation of acoustic energy from respective radiating faces 90 and 90'. The length of the line 300 should be of the order of $$\frac{2n+1}{2}\lambda$$

wherein $n$ is zero or an integar and $\lambda$ is the wavelength in the contained fluid at the operating frequency of the device, if it is desired that the pistons of the two generators move in phase (i.e., in opposite directions in the device of FIG. 17). The actual length of the line 300 may, in practical cases, necessarily depart slightly from $$\frac{2n+1}{2}\lambda$$

because of the effect of the compliance of the cavities 102 or 102' upon the line 300.

The linear spacing between the radiating faces 90 and 90' of the generators 1*a* and 1*b* may be chosen to provide optimum radiation loading on the pistons of the two generators. Furthermore, the housing of the two generators may be physically separated rather than contacting one another at the rear end of each housing. It should be noted also that the two generators may be formed from one integral structure or housing 11 instead of two separate housings 11 and 11'. In either case, acoustic coupling between the two cavities may be achieved by suitable passages extending from the cylindrical cavities or enclosures 102 and 102' of the single housing, which passages are interconnected by appropriate external connectors to the external transmission line 300. Inasmuch as the inlet ports of the fluid inlet channel 25 are displaced a half wavelength when the fluid inlet channels are a quarter wavelength long, the inlet ports of the two devices then may be cross-connected by two acoustic transmission lines to achieve interconnection of the two generators.

Figures 18, 19:
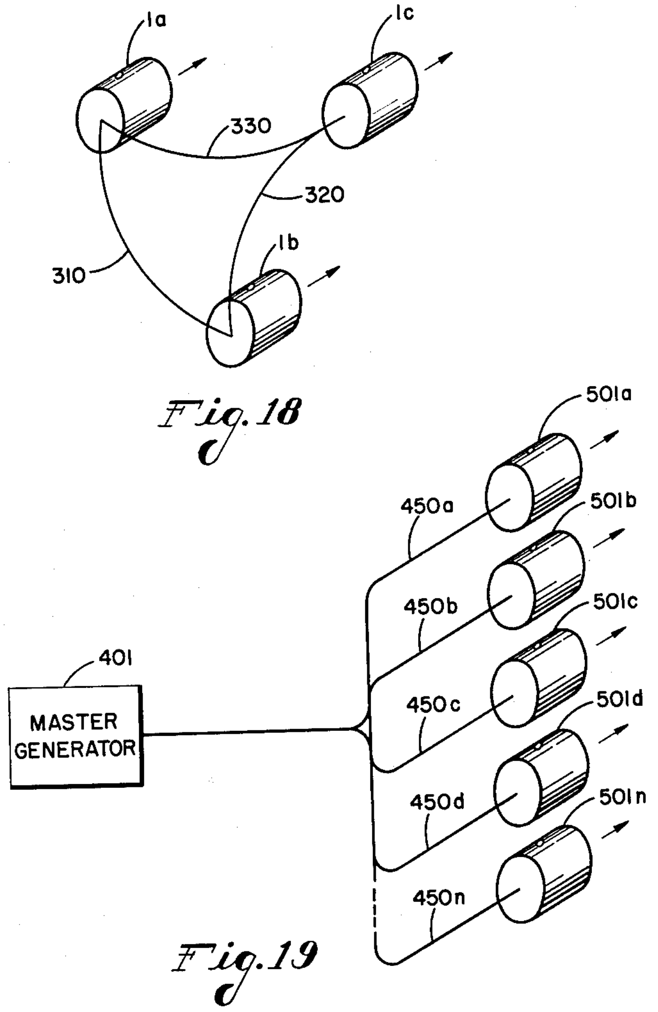
FIG. 18 is a schematic diagram of an array of interconnected acoustic vibration generators of the type shown, for example, in FIGS. 9–11, which provides for radiation of a beam of acoustic energy.
FIG. 19 is a schematic diagram of a master-slave arrangement of acoustic vibration generators such as exemplified in FIGS. 9–11.

In some instances, it may be desirable to arrange two or more generators in a planar array so that the acoustic energy radiated from each reinforces that of the others to provide a particular beam pattern. Such an arrangement is indicated in FIG. 18 wherein three generators 1*a*, 1*b* and 1*c*, which may be of the type shown in FIGS. 9 to 11, are interconnected by acoustic transmission lines 310, 320 and 330. The general direction of energy propagation from the generators of FIG. 18 is indicated by the arrows. For simplicity, fluid connections to the generators have been omitted in this figure. The length of each of the lines may again be of the order of $$\frac{2n+1}{2}\lambda$$

where $\lambda$ is the wavelength of the generated signal in the contained fluid and $n$ is either zero or an integer, thereby causing the radiating elements to be driven in phase synchronism.

A master-slave system of acoustic vibration generators is shown schematically in FIG. 19 wherein a master or control acoustic vibration generator 401 has as its only load acoustic transmission lines 450*a*, 450*b* . . . 450*n* feeding respective slave or controled acoustic vibration generators 501*a*, 501*b* . . . 501*n* which, in turn, may couple energy to a radiation load. The manner of connection of the master generator to the slave generators is similar to that shown in FIGS. 17 and 18. Each of the acoustic transmission lines is of such length as to achieve appropriate coupling of energy from the master generator to the slave generators and to interlock the slave generators in a desired phase relationship. Although each generator may be a non-directional source by itself, the combination of generators may yield a directional array, as is also the case in the array of FIG. 18. By controlling appropriately the length of the individual transmission lines 450*a*, 450*b* . . . 450*n*, the directed acoustic beam generated by the array may be steered to any angle from broadside to end fire.

This invention is not limited to the particular details of construction described, as many equivalents will suggest themselves to those skilled in the art. For example, although the coupling means previously mentioned and illustrated have been described in terms of lumped massive and compliant elements, it is evident that coupling means having distributed mass and compliance may be employed. Specifically, the coupling means 20, 11, 21 of FIG. 7 may be attached to, or may be formed within, a larger solid structure exhibiting distributed mass and compliance, so that the acoustic force transmitted to this larger structure causes the latter to operate at mechanical resonance, thereby accomplishing efficient power transfer between the acoustic vibration generator and the load. This solid structure may be in the form of a cylindrical rod or a uniformly tapered horn; such a structure, of course, may be attached to the surfaces in the devices shown in other figures of this invention across which acoustic energy is to be transferred. It is desired, accordingly, that the appended claims be given a broad interpretation commensurate with the scope of the invention within the art.

What is claimed is:

1. An acoustic vibration generator comprising a housing, a fluid flow control means, said housing having formed therein a pair of chambers separated by said fluid control means, means for introducing a fluid under pressure into each of said chambers, a discharge path for said fluid, said fluid control means including a stationary port structure forming a portion of said housing and a valve movable in response to fluid pressure variations within said chambers for controlling the flow of fluid from said chambers into said discharge path, coupling means including at least one piston coupler partially bounding one of said chambers, said coupling means coupling energy generated by pressure variations within said chambers from said generator.

2. An acoustic vibration generator comprising a housing, a fluid control means said housing having formed therein a pair of chambers separated by said fluid control means, means for introducing a fluid under pressure into said chambers, a discharge path for said fluid, said fluid control means including a port structure forming a portion of said housing and a valve movable in response to fluid pressure variations within said chambers for controlling the flow of fluid from said chambers into said discharge path, coupling means including a piston coupler partially bounding one of said chambers and terminating in an enlarged radiating element, said radiating element being resiliently coupled to said housing, said coupling means continuously coupling energy generated by pressure variations within said chambers from said generator.

3. An acoustic vibration generator comprising a housing having formed therein a pair of chambers each partially bounding a fluid flowing under pressure, a fluid control valve movable in response to fluid pressure variations within said chambers to control the flow of fluid through said chambers, and acoustic energy output coupling means forming a portion of said housing and moving as a rigid body, said coupling means being driven acoustically by the pressure variations in the fluid within said chambers.

4. In an acoustic vibration generator comprising a housing having formed therein a pair of chambers containing a fluid under pressure, a fluid control valve movable in response to pressure variations within said chambers to control the flow of fluid through said chambers, and coupling means terminating in a rigid element disposed within said housing, said coupling means being mechanically independent of said control valve and driven acoustically by the pressure variations in the fluid within said chambers for coupling out acoustic forces developed within said chambers.

5. An acoustic vibration generator comprising a housing having formed therein a pair of chambers, said chambers containing a fluid under pressure, a fluid control valve movable in response to fluid pressure variations within said chambers to control the flow of fluid through said chambers, and coupling means including a rigid coupling member for each of said chambers freely movable within said housing and acoustically driven by the pressure variations in the fluid in said chambers, said coupling means including a rigid element interconnecting each of said coupling members, said element being disposed externally of said housing.

6. An acoustic vibration generator comprising a housing having formed therein a pair of chambers, said chambers containing a fluid under pressure, a fluid control valve movable in response to fluid pressure variations within said chambers to control the flow of fluid through said chambers, said valve having an axial bore, and coupling means including a rigid coupling member for each of said chambers freely movable within said housing and acoustically driven by the pressure variations in the fluid in said chambers, said coupling means including a rigid element interconnecting each of said coupling members, said element extending through said valve bore.

7. An acoustic vibration generator comprising a housing having formed therein a pair of chambers, said chambers containing a fluid under pressure, a fluid control valve movable in response to fluid pressure variations within said chambers, and a port structure cooperating with said valve to control the flow of fluid through said chambers, said valve and said port structure moving simultaneously in opposite directions.

8. An acoustic vibration generator comprising a housing having formed therein a pair of chambers, said chambers containing a fluid under pressure, a fluid control valve movable in response to fluid pressure variations within said chambers, a port structure cooperating with said valve to control the flow of fluid in said chambers, and rigid coupling means movable within said housing and acoustically driven by the fluid in said chambers, said port structure being formed in said movable coupling means, said valve and said port structure moving simultaneously in opposite directions.

9. An acoustic vibration generator comprising a housing having formed therein a pair of chambers, said chambers containing a fluid under pressure, a fluid control valve movable in response to fluid pressure variations within said chambers, a port structure cooperating with said valve to control the flow of fluid in said chambers, and coupling means including a rigid movable coupling member for each of said chambers movable within said housing and acoustically driven by the pressure variations in the fluid in said chambers, said coupling means including a rigid element interconnecting each of said coupling members, said port structure being formed by recesses in said rigid element, said valve and said port structure moving simultaneously in opposite directions.

10. An acoustic vibration generator comprising a housing having formed therein a pair of chambers, said chambers containing a fluid under pressure, a fluid control valve movable in response to fluid pressure variations within said chambers, a port structure cooperating with said valve to control the flow of fluid through said chambers, said valve and said port structure moving simultaneously in opposite directions, and coupling means including a rigid movable coupling member for at least one of said chambers movable within said housing and acoustically driven by the pressure variations in the fluid in said chambers.

11. An acoustic vibration generator comprising a housing having formed therein a pair of chambers, said chambers containing a fluid under pressure, a fluid control valve movable in response to fluid pressure variations within said chambers to control the flow of fluid through said chambers, and coupling means including a pair of movable piston couplers rigidly interconnected and each disposed within a corresponding one of said chambers and subjected to a force generated by pressure variations within said chambers, at least one of said piston couplers terminating in an enlarged radiating element.

12. An acoustic vibration generator comprising a housing having formed therein a pair of chambers, said chambers containing a fluid under pressure, a fluid control valve movable in response to fluid pressure variations within said chambers to control the flow of fluid through said chambers, rigid coupling means movable within said housing and subjected to a force generated by pressure variations within said chambers, said rigid coupling means terminating at one end in an enlarged radiating element, and compliant means cooperating with said radiating element for enhancing energy removal from said generator.

13. An acoustic vibration generator comprising a housing having formed therein a pair of chambers containing a fluid under pressure, a fluid control valve movable in response to fluid pressure variations within said chambers to control the flow of fluid through said chambers, and rigid coupling means movable within said housing and acoustically driven by the pressure variations in the fluid within said chambers, said housing further containing an enclosure terminating one end of said coupling means, the other end of said coupling means terminating in an enlarged radiating element.

14. An acoustic vibration generator comprising a housing having formed therein a pair of chambers containing a fluid under pressure, a fluid control valve movable in response to fluid pressure variations within said chambers to control the flow of fluid through said chambers, rigid coupling means movable within said housing and acoustically driven by the pressure variations in the fluid within said chambers, said housing further containing an enclosure terminating one end of said coupling means, the other end of said coupling means terminating in an enlarged radiating element, and compliant means cooperating with said radiating element for enhancing energy removal from said generator.

15. An acoustic vibration generator comprising a housing having formed therein a pair of chambers, said chambers containing a fluid under pressure, a fluid control valve movable in response to fluid pressure variations within said chambers to control the flow of fluid through said chambers, coupling means including a pair of movable piston couplers rigidly interconnected and each disposed within a corresponding one of said chambers and subjected to a force generated by pressure variations within said chambers, at least one of said piston couplers terminating in an enlarged radiating element, and compliant means cooperating with said radiating element for enhancing energy removal from said generator.

16. An acoustic vibration generator comprising a housing having formed therein a pair of chambers, said chambers containing a fluid under pressure, a fluid control valve movable in response to fluid pressure variations within said chambers to control the flow of fluid through said chambers, and coupling means including a pair of movable piston couplers rigidly interconnected and each disposed within a corresponding one of said chambers and subjected to a force generated by pressure variations within said chambers, at least one of said piston couplers terminating in an enlarged radiating element, said housing further including a fluid-filled cavity between said radiating element and said one piston coupler, said fluid-filled cavity serving as an acoustic backing compliance for enhancing energy removal from said generator.

17. An acoustic vibration generator comprising a housing, a fluid control means, said housing having formed therein a pair of chambers separated by said fluid control means, means for introducing a fluid under pressure into said chambers, a discharge path for said fluid, said fluid control means including a valve movable in response to fluid pressure variations within said chambers for controlling the flow of fluid from said chambers into said discharge path, and rigid coupling means movable within said housing in response to pressure variations within said chambers, said means for introducing including a pair of longitudinally disposed ducts disposed on either side of the longitudinal axis of said housing, said discharge path including a longitudinally disposed passage in said housing.

18. An acoustic vibration generator comprising a housing, a fluid control means, said housing having formed therein a pair of chambers separated by said fluid control means, means for introducing a fluid under pressure into said chambers, a discharge path for said fluid, said fluid control means including a valve movable in response to fluid pressure variations within said chambers for controlling the flow of fluid from said chambers into said discharge path, rigid coupling means movable within said housing in response to pressure variations within said chambers, said coupling means including a pair of piston couplers rigidly interconnected and each disposed within a corresponding one of said chambers, one of said couplers terminating at one end in a tool, said housing including a fluid-filled cavity disposed adjacent the other of said piston couplers on the side thereof opposite the corresponding chamber.

19. An acoustic vibration generator comprising a housing having formed therein a pair of chambers containing a fluid under pressure, a fluid control valve movable in response to fluid pressure variations within said chambers to control the flow of fluid through said chambers, rigid coupling means movable within said housing and acoustically driven by the fluid in said chambers, said housing containing longitudinally disposed ducts for passage of said fluid into and from said chambers, a rotary tool attached to said coupling means, and a plurality of fins attached to said coupling means for imparting rotary motion to said tool when impinged upon by said fluid.

20. An acoustic-vibration generator having, in combination, a housing, a fluid-pressure-actuated valving mechanism, means for introducing a fluid medium under pressure into said housing wherein the flow of the fluid medium may be subjected to a variational throttling action by said valving mechanism, a frequency-controlling acoustic feedback path connected to convey fluid dynamic pressure variations produced by the said variational throttling action upon the valving mechanism in such phase and magnitude as to control and sustain its valving action, thereby to produce a pulsating flow of the fluid medium for generating acoustic vibrations, and coupler means disposed as a free body to move dynamically within the said housing in response to the pulsating flow of the fluid medium.

21. An acoustic-vibration generator having, in combination, a housing, a fluid-pressure-actuated valving mechanism, means for introducing a fluid medium under pressure into said housing wherein the flow of the fluid medium may be subjected to a variational throttling action by said valving mechanism, a frequency-controlling acoustic feedback path connected to convey fluid dynamic pressure variations produced by the said variational throttling action upon the valving mechanism in such phase and magnitude as to control and sustain its valving action, thereby to produce a pulsating flow of the fluid medium for generating acoustic vibrations, and acoustic energy output coupling means forming a portion of said housing and moving substantially as a rigid body, said coupling means being driven acoustically by the pressure variations in the fluid within said housing, said coupling means being isolated mechanically from said valving mechanism.

22. An acoustic vibration generator comprising a fluid flow control means, a pair of chambers formed on opposite sides of said fluid flow control means, means for introducing a fluid under pressure into each of said chambers, discharge means communicating with said chambers through said fluid flow control means, said control means including a port structure and a valve movable relative to said port structure for modulating the flow of fluid from said chambers into said discharge means to produce acoustic pressure variations within said chambers, said valve being driven relative to said port structure in consequence of said pressure variations to sustain the flow modulation at a defined oscillation frequency, and acoustic energy coupling means comprising at least one member coupled to one of said chambers and movable substantially as a rigid body in response to said acoustic pressure variations in said one of said chambers to enable acoustic energy to be transferred from said generator.

23. An acoustic vibration generator as recited in claim 22 wherein the motion of said valve is mechanically independent of the motion of said coupling means.

24. An acoustic vibration generator as recited in claim 22 wherein said valve and said port structure move simultaneously in phase opposition.

25. An acoustic vibration generator comprising a fluid flow control means, a pair of chambers formed on opposite sides of said fluid flow control means, means for introducing a fluid under pressure into each of said chambers, discharge means communicating with said chambers through said fluid flow control means, said control means including a port structure and a valve movable relative to said port structure for modulating the flow of fluid from said chambers into said discharge means to produce acoustic pressure variations within each of said chambers of opposite phase, said valve being driven relative to said port structure in consequence of said pressure variations of opposite phase to sustain the flow modulation at a defined oscillation frequency, and acoustic energy coupling means comprising at least one member coupled to one of said chambers and movable substantially as a rigid body in response to said acoustic pressure variations in said one of said chambers to enable acoustic energy to be transferred from said generator.

26. An acoustic vibration generator comprising a fluid flow control means, a pair of chambers formed on opposite sides of said fluid flow control means, means for introducing a fluid under pressure into each of said chambers, discharge means communicating with said chambers through said fluid flow control means, said control means including a port structure and a valve movable relative to said port structure for modulating the flow of fluid from said chambers into said discharge means to produce acoustic pressure variations within each of said chambers of opposite phase, said valve being driven relative to said port structure in consequence of said pressure variations of opposite phase to sustain the flow modulation at a defined oscillation frequency, and acoustic energy coupling means comprising a first member terminating coupled to one of said chambers and a second member coupling to the other of said member, said first and second chambers being substantially rigidly interconnected and being driven in phase in consequence of said pressure variations of opposite phase in said chambers to enable acoustic energy to be transferred from both chambers of said generator.

27. An acoustic vibration generator comprising a fluid flow control means, a pair of chambers formed on opposite sides of said fluid flow control means, means for introducing a fluid under pressure into each of said chambers, discharge means communicating with said chambers through said fluid flow control means, said control means including a port structure and a valve movable relative to said port structure for modulating the flow of fluid from said chambers into said discharge means to produce acoustic pressure variations within each of said chambers of opposite phase, said valve being driven relative to said port structure in consequence of said pressure variations of opposite phase to sustain the flow modulation at a defined oscillation frequency, acoustic energy coupling means comprising a first member coupled to one of said chambers and a second member coupled to the other of said chambers, said first and second members being substantially rigidly interconnected and being driven in phase in consequence of said pressure variations of opposite phase to enable acoustic energy to be transferred from both chambers of said generator, the cross-sectional areas of each of said first and second members coupled to said chambers being equal to provide for balancing the internal hydrostatic forces exerted upon said coupling means.

28. An acoustic vibration generator comprising a fluid flow control means, a pair of chambers formed on opposite sides of said fluid flow control means, means for introducing a fluid under pressure into each of said chambers, discharge means communicating with said chambers through said fluid flow control means, said control means including a port structure and a valve movable relative to said port structure for modulating the flow of fluid from said chambers into said discharge means to produce acoustic pressure variations within each of said chambers of opposite phase, said valve being driven relative to said port structure in consequence of said pressure variations of opposite phase to sustain the flow modulation at a defined oscillation frequency, and acoustic energy coupling means comprising a first member coupled to one of said chambers and a second member coupled to the other of said chambers, said first and second members being substantially rigidly interconnected and being driven in phase in consequence of said pressure variations of opposite phase to enable acoustic energy to be transferred from both chambers of said generator, the cross-sectional areas of each of said first and second members coupled to said chambers being unequal to provide a net hydrostatic force upon said coupling means.

29. An acoustic vibration generator comprising a fluid flow control means, a pair of chambers formed on opposite sides of said fluid flow control means, means for introducing a fluid under pressure into each of said chambers, discharge means communicating with said chambers through said fluid flow control means, said control means including a port structure and a valve movable relative to said port structure for modulating the flow of fluid from said chambers into said discharge means to produce acoustic pressure variations within each of said chambers of opposite phase, said valve being driven relative to said port structure in consequence of said pressure variations of opposite phase to sustain the flow modulation at a defined oscillation frequency, and acoustic energy coupling means comprising a first member coupled to one of said chambers and a second member coupled to the other of said chambers, said first and second members being substantially rigidly interconnected and being driven in phase in consequence of said pressure variations of opposite phase to enable acoustic energy to be transferred from both chambers of said generator, the cross-sectional areas of each of said first and second members coupled to said chambers being unequal to provide a net hydrostatic force upon said coupling means, the cross-sectional areas of one of said first and second members terminating said chambers being equal and identical with the cross-sectional area of said valve.

30. An acoustic vibration generator for supplying acoustic energy to an acoustic load comprising a fluid flow control means, a pair of chambers formed on opposite sides of said fluid flow control means, means for introducing a fluid under pressure into each of said chambers, discharge means communicating with said chambers through said fluid flow control means, said control means including a port structure and a valve movable relative to said port structure for modulating the flow of fluid from said chambers into said discharge means to produce acoustic pressure variations within said chambers, said valve being driven relative to said port structure in consequence of said pressure variations to sustain the flow modulation at a defined oscillation frequency, acoustic energy coupling means comprising at least one member movable substantially as a rigid body in response to said acoustic pressure variations to enable acoustic energy to be transferred from said generator, and a structure resonant substantially at said defined oscillation frequency interposed between said acoustic energy coupling means and said acoustic load to effect optimum transfer of acoustic energy to said load.

References Cited by the Examiner

UNITED STATES PATENTS

| | | | |
|---|---|---|---|
| 2,792,804 | 5/57 | Bouyoucos | 116—137 |
| 2,859,726 | 11/58 | Bouyoucos | 116—137 |
| 3,004,512 | 10/61 | Bouyoucos | 116—137 |
| 3,105,460 | 10/63 | Bouyoucos | 116—137 |

LOUIS J. CAPOZI, *Primary Examiner.*

CHARLES W. ROBINSON, *Examiner.*